United States Patent
Razavi et al.

(10) Patent No.: US 6,265,503 B1
(45) Date of Patent: Jul. 24, 2001

(54) POLYOLEFIN PRODUCTION

(75) Inventors: Abbas Razavi, Mons; Kai Hortmann, Dilbeek, both of (BE)

(73) Assignee: Fina Research, S.A., Feluy (BE)

(*) Notice: Subject to any disclaimer, the term of this patent is extended or adjusted under 35 U.S.C. 154(b) by 0 days.

(21) Appl. No.: 09/664,236

(22) Filed: Sep. 18, 2000

Related U.S. Application Data

(62) Division of application No. 09/336,350, filed on Jun. 18, 1999, now Pat. No. 6,184,318.

(30) Foreign Application Priority Data

Jun. 19, 1998 (EP) .................................................. 98111334

(51) Int. Cl.$^7$ .................................................. C08F 110/06
(52) U.S. Cl. ........................... 526/160; 526/170; 526/351
(58) Field of Search ................... 526/160, 170, 526/993, 351

(56) References Cited

U.S. PATENT DOCUMENTS

| | | | |
|---|---|---|---|
| 5,334,677 | 8/1994 | Razavi et al. | 526/160 |
| 5,892,078 | 4/1999 | Göres et al. | 502/103 |

FOREIGN PATENT DOCUMENTS

| | | |
|---|---|---|
| 0742227 | 11/1996 | (EP) . |
| 0747406 | 12/1996 | (EP) . |
| 0818475 | 1/1998 | (EP) . |

*Primary Examiner*—Rabon Sergent
*Assistant Examiner*—Olga Asinovsky
(74) *Attorney, Agent, or Firm*—Jim D. Wheelington

(57) ABSTRACT

A $C_1$ symmetric metallocene compound of general formula $R''(CpR_b)CP'R'_m) MQ_p$ for use as a catalyst component in the production of short sequence syndiotactic/isotactic block polyolefins, where Cp is a substituted cyclopentadienyl; each R is independently aryl or hydrocarbyl having 1 to 20 carbon atoms, at least position 3 of Cp is substituted with aryl, at least one other position of Cp is substituted with a non-bulky substituent, and n is an integer in the range from 2 to 4; Cp' is substituted or unsubstituted fluorenyl; each R' is independently hydrocarbonyl having 1 to 20 carbon atoms and m is 0 or an integer in the range from 1 to 8; R" is a structural bridge to impart stereorigidity between Cp and Cp'; M is a metal from Group IIIB, IVB, VB or VIB; Q is a hydrocarbyl radical having 1 to 20 carbon atoms or a halogen; and p is the valence of M minus 2.

4 Claims, 1 Drawing Sheet

POLYOLEFIN PRODUCTION

Figure 1:
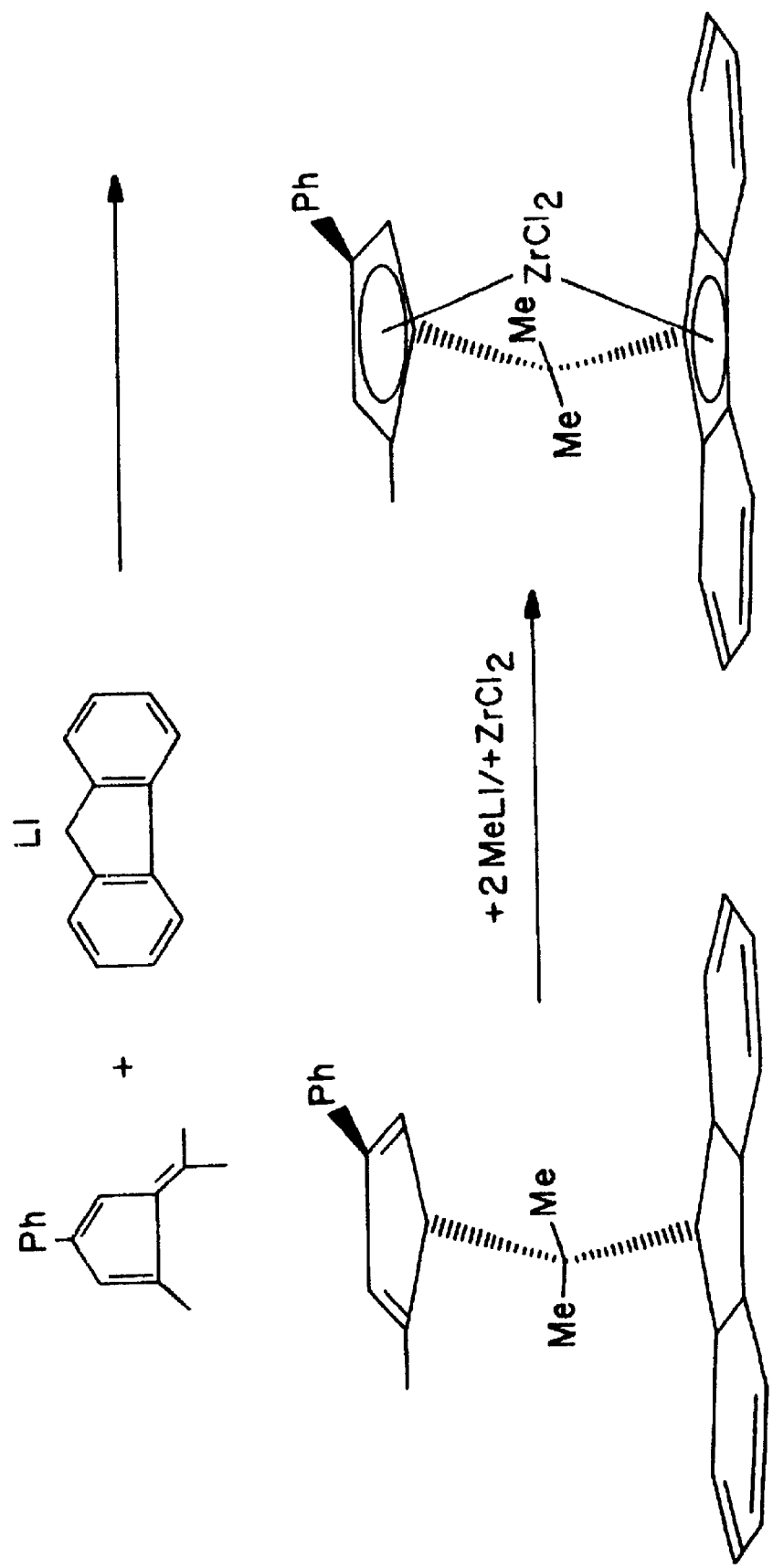

This is a Divisional Application of application Ser. No. 09/336,350, filed Jun. 18, 1999 now U.S. Pat. No. 6,184,318.

FIELD OF THE INVENTION

The present invention relates to a metallocene compound for use as a catalyst component in the production of short sequence syndiotactic/isotactic block polyolefins, catalyst systems containing the metallocene compound and their use in processes for the production of such polyolefins.

BACKGROUND OF THE INVENTION

Olefins having 3 or more carbon atoms can be polymerised to produce a polymer with an isotactic stersochemical configuration. For example, in the polymerisation of propylene to form polypropylene, the isotactic structure is typically described as having methyl groups attached to the tertiary carbon on atoms of successive monomeric units and the same side of a hypothetical plane through the main chain of the polymer. This can be described using the Fischer projection formula as follows:

Another way of describing the structure is through the use of NMR spectroscopy. Bovey's NMR nomenclature for an isotactic pentad is . . . mmmm with each "m" representing a "meso" diad or successive methyl groups an the same side in the plane.

In contrast to the isotactic structure, syndiotactic polymers are those in which the methyl groups attached to the tertiary carbon atoms of successive monomeric units in the chain lie an alternate sides of the plane of the polymer. Using the Fischer projection formula, the structure of a syndiotactic polymer is described as follows:

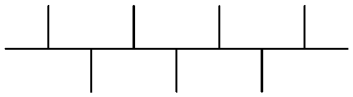

In NMR nomenclature, a syndiotactic pentad is described as . . . rrrr . . . in which "r" represents a "racemic" diad with successive methyl groups on alternate sides of the plane.

In contrast to isotactic and syndiotactic polymers, an atactic polymer exhibits no regular order of repeating unit. Unlike syndiotactic or isotactic polymers, an atactic polymer is not crystalline and forms essentially a waxy product.

The production of syndiotactic/isotactic block polypropylene is known from EP-A-0747406. In these known block polypryoplylenes there is a long isotactic block and few short syndiotactic blocks, A generically defined metallocene compound is disclosed as a catalyst component in the production of these block polypropylenes. The metallocene compound has a cyclopentadienyl ring which is monosubstituted, as exemplified by isopropylidene (3-trimethylsilylcyclopentadienyl-9-fluorenyl) zirconium dichloride and diphenylmethylidene(3-trimethylsilyl cyclopentadienyl-9-fluorenyl) zirconium dichloride.

The production of syndictactic/atactic block polyolefins is known from EP-A-0818475. In these known block polypropylenes there are alternating blacks of long syndiotactic and short atactic sequences. A generically defined metallocene compound is disclosed as a catalyst component in the production of these block polyolefins. The metallocene compound requires a hetero-exemplified atom ligand coordinated to the metal of the metallocene, as exemplified by 2,7-bis-tert-butyl-fluorenyl-9-dimethylsilyl-tert-butyl-amido titanium dichloride.

In EP-A-0423101 and EP-A-0742227 a metallocene compound is described which has a lack of bilateral symmetry, one example of which is isopropylidene (3-methyl cyclopentadienyl-1-fluorenyl)zirconium dichloride. This compound was used in the production of hemiisotactic polypropylene. The structure of hemiisotactic polymers may be represented in a Fischer projection as follows:

The monomeric unit of the polymer is of the following structure:

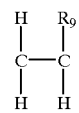

wherein $R_s$ is a hydrocarbyl group or nonhydrocarbyl group.

The structure of the polymer is characterised by $R_s$ groups attached to every other asymmetric carbon atom being on the same side of the principal polymer chain as represented in a Fischer projection and $R_s$ groups attached to the remaining asymmetric carbon atoms being either on the same side or the opposite side of the principal polymer chain. Since only every other one conforms to the isotactic structure, it is "hemi". The material is a noncrystalline polymer.

SUMMARY OF THE INVENTION

The present applicants have surprisingly found that short sequence syndiotactic/isotactic block polypropylenes can be prepared which have high clarity and elastomeric properties using an —aryl—substituted metallocene compound as a catalyst component.

The present invention provides a $C_1$ symmetric metallocene compound of general formula $R"(CpR_n)(Cp'R'_m)MQ_p$ for use as a catalyst component in the production of short sequence syndictactic/isotactic block polyolefins, wherein Cp is a substituted cyclopentadienyl; each R is independently aryl or hydrocarbyl having 1 to 20 carbon atoms, at least position 3 of Cp is substituted with aryl, at least one other position of Cp is substituted with a non-bulky substituent, and n is an integer in the range from 2 to 4; Cp' is substituted or unsubstituted fluorenyl; each R is independently hydrocarbonyl having 1 to 20 carbon atoms and m is O or an integer in the range 1 to 8; R" is a structural bridge to impart stereorigidity between Cp and Cp'; M is a metal from Group IIIB, IVB, VB or VIB; Q is a hydrocarbyl radical having 1 to 20 carbon atoms or a halogen; and p is the valence of M minus 2.

The polyolefin is preferably polypropylene. By short sequence syndiotactic/isotatic block polypropylene is meant a polypropylene that comprises alternating blacks of syndiotactic and isotactic sequence. Preferably, the average sequence length of each sequence is in the range 5 to 20, more preferably 5 to 10, most preferably around 6. The relative frequency of each sequence is typically in the range 1:3 to 3:1.

Preferably the isotactic and syndiotactic sequences have approximately the same length and frequency.

In the metallocene compound, the non-bulky substituent is preferably a linear hydrocarbyl having 1 to 20 carbon atoms, isobutyl or aryl. The non-bulky substituent should not interfere with the bridge and could be situated at position 2 and/or position 5, preferably at position 5. Cp is preferably substituted at position 3 of the ring with Ph.

The metal, M, is preferably Ti, Zr or Rf and Q is preferably a halogen, usually Cl. Typically R" is alkylidene having 1 to 20 carbon atoms, a dialkyl germanium or silicon or siloxhane, alkyl phosphine or amine, preferably a hydrocarbyl radical having at least one carbon atom to form the bridge. More preferably R" is isopropylidene.

In a further aspect there is provided a catalyst system for use in preparing short sequence syndiotactic/isotactic block polyolefins, which comprises (a) a metallacens compound as defined above; and (b) a cocatalyst capable of activating the metallocene compound. Typically, the cocatalyst comprises an aluminium- or boron-containing cocatalyst.

Suitable aluminium-containing cocatalysts comprise an alumoxane, an alkyl aluminium and/or a Lewis acid.

The alumoxanes usable in the process of the present invention are well known and preferably comprise oligameric linear and/or cyclic alkyl alumoxanes represented by the formula:

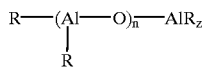

(I)

for oligomeric, linear alumoxanes and

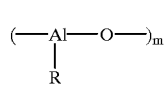

(II)

for oligomeric, cyclic alumoxane,
wherein n is 1–40, preferably 10–20, m is 3–40, preferably 3–20 and R is a $C_1$–$C_8$ alkyl group and preferably methyl. Generally, in the preparation of alumoxanes from, for example, aluminium trimethyl and water, a mixture of linear and cyclic compounds is obtained.

Suitable boron-containing cocatalysts may comprise a triphenylcarbenium baroizate such as tetrakispentafluorophonyl-borato-triphenylcarbenium as described in EP-A-0427696, or those of the general formula [$L^1$—H]+[B $Ar_1Ar_2X_3X_4$]— as described in EP-A-0277004 (page 6, line 30 to page 7, line 7).

The catalyst system may be employed in a solution polymerisation process, which is homogeneous, or a slurry proceima, which is heterogeneous. In a solution process, typical solvents include hydrocarbons with 4 to 7 carbon atoms such as heptane, toluene or cyclohexane. In a slurry process it is necessary to immobilise the catalyst system on an inert support, particularly a porous solid support such as talc, inorganic oxides and resinous support materials such as polyolefin. Preferably, the support material is an inorganic oxide in tis finely divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, an the like. Other suitable support materials, however, can be employed, for example, finely divided functionalized polyolefins such as finely divided polyethylene.

Preferably, the support is a silica having a surface area comprised between 200 and 700 $m^2$/g and a pore volume comprised between 0.5 and 4 ml/g.

The amount of alumoxane and metallocene usefully employed in the preparation of the solid support catalyst can vary over a wide range. Preferably the aluminium to transition metal mole ratio is in the range between 1:1 and 100:1, preferably in the range 5:1 and 50:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane, and aromatics such as benzene, toluene, ethylbenzene and diethylbenzene.

Preferably the support material is slurried in toluene and the metallocene and alumoxane are dissolved in toluene prior to addition to the support material.

In a further aspect the present invention provides a process for preparing a short sequence syndiotactic/isotactic block polyolefin, which comprises contacting the catalyst system with at least one olefin in a reaction zone under polymerisation conditions.

In a further aspect there is provided a polypropylene comprising at least 10 alternating blocks of syndictactic sequence and isotactic sequence, wherein the relative frequency of the sequences in the polypropylene is in the range 1:3 to 3:1, as determined by the ratio of mmmm pentads to rrrr pentads in 13 C NMR spectroscopy.

The invention will now be described in further detail, by way of example only, with reference to the following Examples and the accompanying drawings, in which:

FIG. 1 shows in outline a reaction scheme for the production of isopropylidene(3-phenyl-5-methylcyclopentadienyl-9-fluorenyl)zirconium dichloride.

DETAILED DESCRIPTION OF THE INVENTION

Example 1

Synthesis of isopropylidene (3-phenyl-5-methylcyclopentadienyl-9-fluorenyl) zirconium dichloride The synthesis is shown in outline in FIG. 1. In a 500 ml flask equipped with a magnetic stirrer and a nitrogen inlet, 14.5 grams (87 mmole) of fluorene is dissolved in 140 ml of tetrahydrofuran (THF). At 0° C. an equimalar amount of methyllithium (MeLi) in ether is added dropwise and the resulting red reaction mixture is stirred for 2 h at ambient temperature. At 0° C. an equimolar amount of 1-methyl-3-phenyl-6,6-dimethylfulvene in THF is added dropwise. The reaction mixture was stirred overnight at ambient temperature and hydrolysed with an aqueous, saturated solution of ammonium chloride in water. Subsequently the organic phase was separated with ether and dried over $MgSO_4$. The evaporation of the solvents yielded an offwhite solid (70% yield after recrystallization). 5.44 g (15 mmole) of the ligand prepared above was dissolved in 100 milliliters of THF and treated with two equimalar quantities of MeLi in diethyl ether under nitrogen at 0° C. The red reaction mixture was stirred at ambient temperature overnight. After evaporation of THF a red powder was obtained that was washed with pentane. The powder was suspended in 200 milliliters of pentane and reacted with an equimolar amount of zirconium tetrachloride. A crude product was obtained which was dissolved in methylene chloride and filtered to separate the lithium chloride by-product. The methylene chloride is evaporated and the resulting solid washed with toluene until purely red (47% yield) The structure and composition were determined by 1H NM.

Example 2

Polymerisation Procedure and Results

Propylene was polymerized using 1.8 mg milligrams of isopropylidene (3-phenyl-5-methylcyclopentadienyl-9-fluorenyl) zirconium dichloride produced by the method above. One liter of liquid propylene was introduced into a Buechi reactor at room temperature. The catalyst was placed in three millimeters of 11% MAO in toluene to form a solution which was added to the reactor at 40° C. and the temperature then increased to 60° C. The polymerization reaction was allowed to run for 60 minutes during which time the reactor was maintained at 60° C. The reaction was terminated by venting the reactor of monomer. The catalyst activity in kilograms of polypropylene per grams of catalyst per hour was calculated. The molecular weight, molecular weight distribution, glass transition temperature and $^{13}C$ NMR analysis of the polymer were determined.

A polypropylene was obtained at an hourly production rate of 60 kg/g catalyst which had a number average molecular weight (Mn) at 58528 Da, a weight average molecular weight (Kw) of 136212 Da, a D value (Mw/Mn) of 2.3 and a glass transition temperature of −3° C.

Table 1 shows the results of microtactitity analysis 13C NMR data in which the % of mmmm pentads is close to the % of rrrr pentads confirming the production of short sequence syndiotactic/isotactic polypropylene.

The length of stereoblocks can be estimated by the following formulae [Xu at al., Macromolecules, Vol.30, No.9, 1997, p. 2539]:

The average sequence length of racemic units in long racemic sequences can be estimated as $l(r)=2[rrrr]/[mrrr]+3$ Similarly, the average sequence length of meso units in long meso sequences can be estimated as $l(m) \ 2[mmmm]/[mmmr]+3$ Applying these formulae to the data in Table 1 for the polymer from Example 2 this calculates to an average sequence length of racemic units of 6 and an average sequence length of meso units of likewise 6.

TABLE 1

| Sequence | % |
|---|---|
| PENTADS | |
| mmmm | 19.82 |
| mmmr | 13.00 |
| rmmr | 6.00 |
| mmrr | 23.76 |
| rmrr + mrmm | 2.34 |
| mrmr | 1.02 |
| rrrr | 15.24 |
| mrrr | 11.30 |
| mrrm | 7.52 |
| TRIADS | |
| mm | 38.82 |
| mr | 27.12 |
| rr | 34.06 |
| DYADS | |
| m | 52.38 |
| r | 47.62 |

What is claimed is:

1. A polypropylene comprising at least 10 alternating blocks of syndictactic sequence and isotactic sequence, wherein the realative frequency of the sequence in the polypropylene is in the range 1:3 to 3:1, as determined by the ratio of mmmm pentads to rrrr pentads in 13C NMR spectroscopy.

2. A polypropylene according to claim 1, wherein the relative frequency of the sequences is approximately 1:1.

3. A polypropylene according to claim 1, wherein the syndiotactic and isotactic sequences each have an average sequence length in the range 5 to 20.

4. A polypropylene according to claim 3, wherein the average sequence length is in the range 5 to 10.

* * * * *